July 17, 1934.  C. L. KROPP  1,966,553
ABSORBENT BRIQUETTE
Filed Oct. 20, 1932

INVENTOR
CLAYTON L. KROPP
BY
Brockett, Hyde, Higley & Meyer.
ATTORNEYS

Patented July 17, 1934

1,966,553

UNITED STATES PATENT OFFICE 1,966,553

ABSORBENT BRIQUETTE

Clayton L. Kropp, Cleveland, Ohio, assignor to The Ohio Carbon Company, Cleveland, Ohio, a corporation of Ohio Application October 20, 1932, Serial No. 638,826

8 Claims. (Cl. 252—2.5)

This invention relates to absorbent materials, particularly in rigid or briquette form, and to the process of making the same. It has particular relation to certain classes of absorbing or adsorbing materials, such as carbon in various forms, either natural or artificial, silica gels, or other like substances ordinarily employed in finely divided or granular form and used for absorption, adsorption, filtration, decolorization of solutions, dehydration of air or gases, purification of lubricating oils and for like purposes.

Such finely divided or granular materials, while usable and while valuable in varying degrees for the purposes mentioned, are all handicapped by the physical form of the material and the necessity for providing means for holding it in situ during the filtering, absorbing, adsorbing or other operation for which it is employed. As a result, it has been desirable and this invention aims to supply a method by which the otherwise loose, granular or finely divided material may be worked up into a rigid form, such as in briquettes, blocks or masses of various shapes adapted to particular uses, but nevertheless without impairing or at least without materially impairing its efficiency as a filtering, adsorbing or absorbing medium or for whatever purpose it may be employed. As a result, the now rigid masses containing the material are readily incorporated into the structure where they are used, with the possibility of firm support and with a longer life and reduced losses in use.

While the invention applies equally to materials of this kind used for absorption, adsorption, filtration, decolorization, purification, etc., for convenience and in no sense of limitation, I will hereafter designate this entire class of materials as absorption materials, because uniformly in the various processes or methods where such substances are employed they accept, acquire or take into their structure some other material to be abstracted during the process, such as a gas occluded within the pores of the adsorbing material in the case of adsorption, solid materials acquired during filtration, and so on.

Further objects of the invention are in part obvious and in part will appear more in detail hereinafter.

Figure 1:
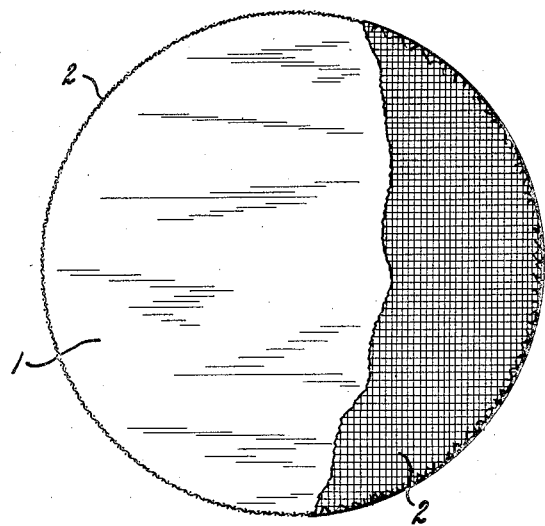
Figure 2:
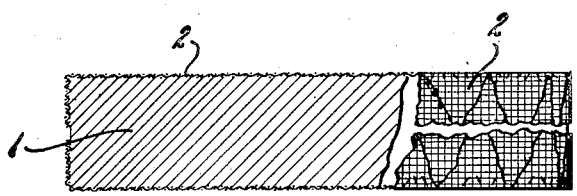

In the drawing, Fig. 1 is a plan view, partly broken out, showing one embodiment of the invention; and Fig. 2 is a side elevation thereof, partly broken out and in section.

According to my invention, I incorporate the absorbing material with a certain proportion of a suitable binding substance, which preferably is a thermo-setting bond, or, in other words, a substance which hardens and becomes more or less rigid when subjected to a raised or elevated temperature. Characteristic materials for this purpose are the phenol-formaldehyde condensation or other artificial resins, which can be prepared in the raw state as a pulverized or finely divided solid, or even as a liquid, and which upon heating to an elevated temperature, say 125° to 250° C., become solid or rigid by polymerization, ordinarily evolving certain gases during the polymerizing process. Such substances ordinarily would be conceived not useful as a binder for absorbing materials of the kind referred to, by reason of the likelihood of the binder either encasing and more or less sealing up particles of the absorbing material or shutting off the microscopic or submicroscopic pores or cavities therein, or as the result of adsorption or absorption by the pores of the gases evolved during polymerization and the inability subsequently to drive off the thus occluded gases.

I have discovered, however, that by special treatment and under certain conditions these thermo-setting materials, such as the artificial thermo-setting materials described, may be satisfactorily employed as a binder for the purpose of converting finely divided absorbing materials into briquette or other rigid forms. I accomplish the results by including in the mixture of finely divided absorbing material and pulverized or finely divided artificial resin a suitable quantity of a liquid which is volatile by heat under the conditions of the process, and which preferably is not a solvent for the artificial resin or other thermo-setting bond employed, or at least the thermo-setting bond is at best sparingly soluble in such liquid. Also, the liquid should preferably be one which is not absorbed by the absorbing material employed. For example, in the case of activated or other form of carbon, silica gel, or like absorbing material, bound together with an artificial resin, such as a condensation product of phenols and formaldehyde, I employ water as the liquid referred to, mixing together suitable quantities of the carbon or other absorbing material, the condensation product and water, so as to form a more or less adherent mass which can be worked as a plastic and molded or otherwise formed into the desirable shape, such as in the shape of a brick, a hollow cylinder, or other forms. These materials may be mixed together in such proportions as to enable them not only to be molded but to be lifted out of the mold and handled as units before heat treatment, although that is not essential.

Either while within the mold or in some other place the formed masses of material are subjected to a suitable elevated temperature, the temperature being raised more or less suddenly or abruptly for a purpose which will appear. The result of elevation of the temperature is to cause polymerizing action in the artificial resin, converting it into permanent rigid form, and such action more or less honeycombs the artificial resin so that it becomes nothing more than a rigid bridge or bond between adjacent particles of the carbon or other absorbing material which, in finely divided or granular form, is distributed throughout the entire mass. While the temperature is being raised, the water of course is converted into vapor or steam and serves as a scavenging agent to either directly carry away with it any gases which may be produced by polymerization of the resin, preventing such gases from entering or choking the pores or cavities of the absorbing material, or if the gases do enter the pores, the steam or water vapors may serve the purpose of scavenging said pores with an activating action. The result is to ultimately drive off all of the water and the gases which are produced from the artificial resin during polymerization, leaving nothing but the carbon or other absorbing substance with its particles bound together in a porous rigid mass of the form in which the original block or briquette was molded or shaped.

Experience has shown that by choosing proper proportions not only is the absorbing ability of the carbon or other material substantially wholly retained, but it may even be increased under certain circumstances. The larger the content of thermo-setting bond, artificial resin or the like, the greater, of course, is the likelihood of decreasing efficiency by choking or blocking the pores or coating the surfaces of the particles of carbon or like material. I have employed artificial resins for the purposes described in amounts as high as 33% by weight of the entire block, but the actual efficiency of the contained activated carbon under such conditions was reduced approximately 50%. While it may be desirable in some cases to sacrifice efficiency of the incorporated activated carbon in favor of strength of the finished product, I have found that by employing from 5% to 10% of thermo-setting bond material, I am enabled to retain practically complete efficiency in absorbing ability of the incorporated substance and still retain sufficient strength in the rigid article to make it of practical use.

To economize, it is usually desirable to introduce into the mixture certain additional substances, not only as fillers to increase the bulk and reduce cost, but also for the purpose of to some extent increasing the absorbing or adsorbing ability. Various materials may be used for this purpose. Cork in more or less finely divided form is one suitable substance which largely increases the bulk and materially reduces the weight. It has the further advantage of securing a wider distribution of the particles of absorbing material, such as activated carbon, separating them from each other and affording greater opportunity of direct contact between the carbon and the material being treated during the absorbing operation, such as a gas or the like. In place of cork any other suitable absorbing substance, either resinous or otherwise, may be employed, such as cotton linters, wood pulp, textile fabrics or the like.

Another filler which advantageously may be employed is asbestos, preferably in long fibrous form and well broken up. Such asbestos may be used as a filler not only for purposes of economy, as before, but also because its fibers interlock with each other and with the thermo-setting bond and strengthen or mechanically reinforce the entire structure. The asbestos of course is more or less inert to most chemical substances, as well as to raised temperatures and is particularly valued for these reasons. Cork, cotton linters and wood pulp, on the other hand, may be used only within reasonable temperature limitations, where the material is not heated to such a high temperature as to ignite or injure the contained filler.

If the various ingredients are properly proportioned, the resulting product, made in the manner described, is of such nature that the gases or solutions to be acted upon will readily penetrate into and pass through the briquette or block and be acted upon by the incorporated active substance in a manner as efficient as the active ingredient itself would be if unincorporated in a rigid structure. As an example, activated carbon has been prepared in rigid form in the manner described for use as a deodorizer. 15 grams of activated carbon in such rigid form is found to absorb from 7½ to 8 grams of carbon tetrachloride vapor, comparing favorably with or even being slightly more efficient than the contained amount of carbon if the latter were subjected to the same gas absorption test without briquetting. Indeed, where asbestos with or without other materials has been used as a filler, it has sometimes been found that my rigid bricks or blocks have greater absorbing ability than the corresponding amount of activated or absorbing substance used alone, due doubtless not only to substantially full efficiency of the absorbing material when in block or briquette form, but also to some additional absorbing ability of the asbestos or other contained filler, as well as to the form or structure of the briquette itself.

The water or other volatile liquid is employed not only for the purpose of scavenging or protecting or activating the absorbing material, but also for the purpose of assisting in giving the finished rigid article a porous nature by its production of vapor, with a consequent tendency to produce a sponge or honeycomb structure. In cases where thermo-setting bonds are employed other than artificial resins of the phenolic group, liquids other than water may be employed, so long as such liquids are volatile and have no more than slight solubilizing action upon the bond medium employed.

Of course, other thermo-setting bond materials than the synthetic or other resins may be employed. For example, in certain cases it may be desirable to use as a thermo-setting bond glucose or one of the sugars, or even a pitch or asphalt of mineral or other form. These substances, the sugars, pitches and asphalts, as well as other similar substances, also produce a bonding structure as the result of an elevation in temperature, usually by a coking or analogous process, which drives off certain of the material as gases and leaves a honeycombed, more or less carbonaceous residue. When such thermo-setting bond materials are employed, they are used in the same manner as the phenolic condensation bonds described, by the use in connection therewith of a volatile liquid in which the thermo-setting bond material is insoluble or at least only sparingly soluble. In the case of glucose or the sugars, for instance, the liquid may be carbon tetrachloride or an alcohol, both of which are volatile and will produce the scavenging effects before referred to. With asphalt or a pitch the volatile liquid again may be water, with results similar to those in the case of phenolic condensation products. With these other therom-setting bonding materials fillers may be employed and the mixture molded or pressed to any suitable or desired form prior to heat treatment, as before.

Again, it should be noted that where filling materials are used, such as asbestos, cork, or any other material, the scavenging liquid employed should be one in which such filling materials are insoluble or at least only sparingly soluble, just as in the case of the bond material.

This method also makes it possible, in the case of activated carbon and like finely divided materials, to use the finer particles and dust which ordinarily are rejected because impairing efficiency of the more coarse material by stopping the free flow of gases or liquids through the free flowing mass. Such powder or dust of course has a certain adsorbing or absorbing ability but which is not available for use because of the physical structure, but when such powder or dust is mixed with a binder and other materials in the manner described, the particles of the powder or dust, even though in very fine form, become distributed or disseminated throughout the mass and thus separated from each other and able to function fully with their adsorbing or absorbing ability. Thus a large proportion of material which heretofore has been thrown away or wasted can be salvaged for use.

Materials other than activated carbon may be used in this manner in briquette or other solid form for various other purposes. For example, vegetable charcoal may be briquetted or put up in solid or rigid form for use in the decolorization of solutions. Certain natural mined charcoals may also be employed for the filtration of oils or other liquids. Further, certain mineral carbons have the ability to filter and purify ordinary grades of lubricating oils or like materials. By increasing the carbon content in my mixture, as well as the amount of thermo-setting bond, resin or other binder, and by reducing the quantity of asbestos and using a shorter fiber form of asbestos, I am able to produce a stronger and closer meshed article. This article, in rigid form, may consist of approximately 40-50% mineral carbon, 30-40% of thermo-setting bond or binder, and the remainder short fiber asbestos. The proportions of the ingredients will be varied according to the desired porosity and activity required by the particular oil or use. The increased binder results in sufficient hardness of the finished rigid article to permit a definite finishing of its surfaces for the fitting of a leak-proof gasket at the inlet or outlet of the device when used as a filter, absorber or the like.

When the invention is applied for use in connection with other absorbing or adsorbing materials than carbon, such, for example, as silica gels or like materials in finely divided form, the binder again must be a thermo-setting bonding material, such as an artificial resin, a coking material or the like, and the volatile liquid again should be one in which the bond and filling materials are at best only sparingly soluble. For example, a mixture of water, an artificial resin of the kind described, and finely divided silica gel is abruptly subjected to an elevated temperature, the water, in which the resin is insoluble, again is driven off with a scavenging action as to the gases evolved during polymerization, and if the water as vapor or otherwise enters the pores of the adsorbing material, it does so without likelihood of blocking the pores or sealing the porous structure, and is readily driven off by heat, so that the net result again is a rigid block or mass of absorbing or adsorbing silica gel or like material held together by a more or less porous and honeycombed bond and retaining substantially full absorbing or adsorbing ability.

Briquettes, blocks or rigid masses of various forms and shapes and embodying my invention may be used for various purposes and in many ways. For example, any number of such briquettes in more or less brick form or shape may be assembled in a suitable framework as a rigid multiple briquette structure of suitable size to take care of large quantities of gas passing over or through the same for use in adsorption of objectionable fumes which otherwise might be given off through a stack to the atmosphere. Also, the briquettes or blocks may be used individually and in any desired shape.

The drawing shows one simple form adapted for individual use and particularly as an adsorber, or absorber for deodorization of the cooling chamber of a refrigerator, being adapted to collect and retain odors given off by one kind of food which might be deleterious to or affect others. The particular briquette shown in the drawing for this purpose was made from a composition as follows:

|  | Per cent |
|---|---|
| Activated carbon | 20 |
| Artificial resinous bond material | 5 |
| Asbestos filler | 45 |
| Cork filler | 30 |

Such a composition, molded to shape and made rigid by sudden or abrupt elevation of temperature, is self-supporting in the sense that it can be handled like a brick or other solid rigid article. Nevertheless, the structure is somewhat delicate in that rough handling, shocks or jars may break away small fragments of the material and if the block is suspended from the bottom of a shelf in a refrigerator articles coming in contact with it may break off small pieces which fall into the food-containing vessels. Therefore, I form blocks or briquettes for this and like uses in such manner as to include, as a part of the rigid structure itself and essentially integral therewith, a suitable envelope or cover of suitable foraminous material. Fine wire mesh is suitable for the purpose, but a simpler envelope is made of some cheap porous textile fabric such as ordinary gauze. The block shown in the drawing comprises a body portion 1 made of the composition and in the manner described. It is inclosed within an envelope 2 made of gauze in the manner and for the purpose described. In the fabrication of this block a disc of gauze a little larger than the overall diameter of the finished block is first laid in the cylindrical mold cavity, sufficient quantity of the plastic mixture is introduced to fill the mold, and a single disc of gauze is applied over the top, the edges of the two discs being lapped around the side surface of the block to be formed. Heat is then applied and the thermo-setting bond material not only becomes a rigid bond between the particles of absorbing material and filler, but also becomes attached to the fibers of the textile fabric so that the latter is cemented to the block as a whole and becomes an integral part thereof. This envelope is fully porous and in no way interferes with access of the air or gas to the absorbing material within the block and nevertheless, if particles of the block structure break away from the mass they are still held in situ and not permitted to escape. Blocks of this kind may be used in multiple in the manner before described with the same advantages of holding the mass together in case parts become accidentally detached from each other. Also, gauze or other foraminous material of the same character may be introduced into the material of the block itself in the same manner as the asbestos and cork to serve as an additional reenforcing medium, as will be readily understood.

What I claim is:

1. As an article of manufacture, a rigid porous mass consisting of a mixture of a finely divided carbonized absorbing material and a thermo-setting resinous condensation product as a bond therefor.

2. As an article of manufacture, a rigid porous mass consisting of a mixture of a finely divided carbonized absorbing material and a thermo-setting resinous condensation product as a bond therefor, together with a filler.

3. As an article of manufacture, a rigid porous mass consisting of a mixture of a finely divided carbonized absorbing material and a thermo-setting resinous condensation product as a bond therefor, together with a filler including fibrous asbestos.

4. As an article of manufacture, a rigid porous mass consisting of a mixture of a finely divided carbonized absorbing material and a thermo-setting phenol-formaldehyde resin bond therefor, together with a filler including cork.

5. The method of producing an absorbing device, consisting in mixing together a finely divided absorbing material and a thermo-setting bond material and a volatile liquid in which the thermo-setting bond material is substantially insoluble, and suddenly elevating the temperature to drive off the volatile liquid and to convert the bond material into a rigid binder before it can flow into the spaces vacated by the liquid.

6. An absorbent block consisting of a mixture of finely divided activated carbon and a binder of thermo-setting phenol-formaldehyde resin.

7. The process of forming a finely divided absorbing substance into rigid form without destroying its absorptivity, consisting in mixing together a finely divided carbonized absorbing substance, a thermo-setting artificial resin bond material therefor, and water, forming the same into masses of desired shape and abruptly raising the temperature of the mass to a point where the water is driven off and the thermo-setting bond material becomes rigid without flowing into the pores of the absorbing substance, leaving the latter with substantially full efficiency.

8. The method of forming a finely divided absorbing substance into rigid form, consisting in mixing together a finely divided carbonized absorbing substance, a thermo-setting phenol-formaldehyde resin bond material therefor, a filling material, and water, and abruptly raising the temperature to a point where the water is driven off and the bond material becomes rigid before it has time to flow into the spaces vacated by the water, leaving the absorbing substance with substantially full efficiency.

CLAYTON L. KROPP.